(12) United States Patent
Miller et al.

(10) Patent No.: US 7,440,245 B2
(45) Date of Patent: Oct. 21, 2008

(54) ARC FAULT CIRCUIT INTERRUPTER AND METHOD OF DETECTING AN ARC FAULT

(75) Inventors: Theodore J. Miller, Oakdale, PA (US); Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 425 days.

(21) Appl. No.: 10/951,559

(22) Filed: Sep. 28, 2004

(65) Prior Publication Data

US 2006/0072256 A1    Apr. 6, 2006

(51) Int. Cl.
*H02H 3/00* (2006.01)
*H02H 9/08* (2006.01)
*H02H 7/00* (2006.01)

(52) U.S. Cl. .............. 361/42; 361/5; 361/6; 361/7; 361/44

(58) Field of Classification Search .......... 361/5–7, 361/42, 44
See application file for complete search history.

(56) References Cited

U.S. PATENT DOCUMENTS

| | | | |
|---|---|---|---|
| 5,224,006 A | 6/1993 | MacKenzie et al. | |
| 5,691,869 A | 11/1997 | Engel et al. | |
| 6,522,228 B2 | 2/2003 | Wellner et al. | |
| 6,522,509 B1 | 2/2003 | Engel et al. | |
| 6,542,056 B2 | 4/2003 | Nerstrom et al. | |
| 6,639,768 B2 | 10/2003 | Zuercher et al. | |
| 6,710,688 B2 | 3/2004 | Wellner et al. | |
| 7,161,775 B2 * | 1/2007 | Schmalz | 361/5 |
| 2005/0259369 A1 * | 11/2005 | Schmalz | 361/5 |

\* cited by examiner

*Primary Examiner*—Michael J Sherry
*Assistant Examiner*—Dharti H Patel
(74) *Attorney, Agent, or Firm*—Bradley J. Diedrich (57) ABSTRACT

An arc fault circuit interrupter includes separable contacts, an operating mechanism adapted to open and close the separable contacts, and a trip mechanism cooperating with the operating mechanism to trip open the separable contacts. The trip mechanism includes a peak detector determining a peak amplitude of a current pulse of the current flowing in a power circuit. A microprocessor determines whether the peak amplitude of the current pulse is greater than a predetermined magnitude. A plurality of routines including a time discounted accumulation algorithm, a short delay algorithm and a series time discounted accumulation algorithm, employ the peak amplitude to determine whether an arc fault condition exists in the power circuit.

13 Claims, 8 Drawing Sheets

ARC FAULT CIRCUIT INTERRUPTER AND METHOD OF DETECTING AN ARC FAULT

BACKGROUND OF THE INVENTION

1. Field of the Invention

This invention relates to electrical switching apparatus and, more particularly, to circuit interrupters, such as, for example, aircraft circuit breakers providing are fault protection. The invention also relates to methods for detecting arc faults.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

Subminiature circuit breakers are used, for example, in aircraft electrical systems where they not only provide overcurrent protection but also serve as switches for turning equipment on and off. Such circuit breakers must be small to accommodate the high-density layout of circuit breaker panels, which make circuit breakers for numerous circuits accessible to a user. Aircraft electrical systems usually consist of hundreds of circuit breakers, each of which is used for a circuit protection function as well as a circuit disconnection function through a push-pull handle.

Typically, subminiature circuit breakers have only provided protection against persistent overcurrents implemented by a latch triggered by a bimetal responsive to $I^2R$ heating resulting from the overcurrent. There is a growing interest in providing additional protection, and most importantly arc fault protection.

During sporadic arcing fault conditions, the overload capability of the circuit breaker will not function since the root-mean-squared (RMS) value of the fault current is too small to activate the automatic trip circuit. The addition of electronic arc fault sensing to a circuit breaker can add one of the elements required for sputtering arc fault protection—ideally, the output of an electronic arc fault sensing circuit directly trips and, thus, opens the circuit breaker. See, for example, U.S. Pat. Nos. 6,710,688; 6,542,056; 6,522,509; 6,522,228; 5,691,869; and 5,224,006.

It is believed that known arc fault detection methods could not be used with the smallest class of aerospace breakers because of space constraints. Consequently, a new electronics approach with minimal component count is needed, which meets space requirements and, also, offers relatively lower cost and higher reliability.

Known digital arc fault detection techniques for aerospace systems operate periodically at regular intervals. That is, at the end of each electrical half-cycle, the detection circuit performs the same sequence of events, collecting information about the currents and voltages in the electrical system and processing this information using various algorithms. If the rules specified by the algorithms indicate that a hazardous condition exists, then the arc fault detection circuit requests the circuit breaker to interrupt the current.

In these arc fault detection circuits, the half-cycle periodicity results from use of a voltage zero-crossing detector, which generates a logic level square wave synchronized to the line voltage. Whenever the square wave changes state (at voltage zero crossings), an interrupt occurs within a microprocessor. The microprocessor then collects information about the state of the electrical system, performs one or more algorithms, and issues a trip request, if needed.

However, aerospace circuit breakers are relatively small compared with most residential, commercial and industrial circuit breakers. The printed circuit board area available for arc fault detection electronics in the smallest aerospace circuit breakers is minimal. As such, it is believed that known arc fault detection techniques cannot be implemented in the smallest aerospace circuit breaker package style because there is simply not enough printed circuit board space to accommodate the required electronics.

There is room for improvement in arc fault circuit interrupters and in methods for detecting arc faults.

SUMMARY OF THE INVENTION

These needs and others are met by the present invention, which determines a peak amplitude of a current pulse of a current flowing in a power circuit, determines whether the peak amplitude of the current pulse is greater than a predetermined magnitude, and responsively employs one or more algorithms and the peak amplitude to determine whether an arc fault condition exists in the power circuit.

In accordance with one aspect of the invention, a method of detecting an arc fault in a power circuit comprises: determining a peak amplitude of a current pulse of a current flowing in the power circuit; determining whether the peak amplitude of the current pulse is greater than a predetermined magnitude; and responsively employing at least one algorithm and the peak amplitude to determine whether an arc fault condition exists in the power circuit.

The method may maintain the at least one algorithm in an inactive state until after determining that the current pulse has the peak amplitude of greater than the predetermined magnitude. The method may activate the at least one algorithm from the inactive state without sensing the voltage of the power circuit. The method may activate the at least one algorithm from the inactive state without detecting a zero-crossing of a voltage of the power circuit.

The method may determine that the current pulse has the peak amplitude of greater than the predetermined magnitude and responsively activate the at least one algorithm from the inactive state; employ a plurality of half-cycles of the current flowing in the power circuit including a present half-cycle and a previous half-cycle; and employ as one of the at least one algorithms: determining the peak amplitude of the current pulse for the present half-cycle and the previous half-cycle, determine that the peak amplitude of the current pulse for the previous half-cycle is greater than about zero and responsively add an amount equivalent to an increase in the peak amplitude from the previous half-cycle to the present half-cycle to an accumulator, and otherwise, add an amount equivalent to the peak amplitude of the present half-cycle to the accumulator, decay the amount stored in the accumulator over time, and determine an arc fault condition in the power circuit if the amount stored in the accumulator exceeds a predetermined value.

The method may deactivate the at least one algorithm to the inactive state a predetermined time after the responsively activating.

The method may determine that the current pulse has the peak amplitude of greater than the predetermined magnitude and responsively activate the at least one algorithm from the inactive state; and employ as one of the at least one algorithms: adding an amount equivalent to the peak amplitude of the current pulse to an accumulator, decaying the amount stored in the accumulator over time, and determining an arc fault in the power circuit if the amount stored in the accumulator exceeds a predetermined value.

The method may determine that the current pulse has the peak amplitude of greater than the predetermined magnitude and responsively activate the at least one algorithm from the inactive state; employ a plurality of half-cycles of the current flowing in the power circuit including a present half-cycle and a number of previous half-cycles, the half-cycles of current being defined by a current pulse having a peak amplitude of greater than the predetermined magnitude; determine a time to the present half-cycle from the previous half-cycle which is immediately prior to the present half-cycle; employ as one of the at least one algorithms: determining that the time to the present half-cycle from the previous half-cycle which is immediately prior to the present half-cycle is greater than a predetermined time and responsively adding a predetermined amount to an accumulator, decaying the amount stored in the accumulator over time, and determining an arc fault in the power circuit if the amount stored in the accumulator exceeds a predetermined value.

As another aspect of the invention, an arc fault circuit interrupter comprises: separable contacts; an operating mechanism adapted to open and close the separable contacts; and a trip mechanism cooperating with the operating mechanism to trip open the separable contacts, the trip mechanism comprising: a first circuit determining a peak amplitude of a current pulse of the current flowing in the power circuit, a second circuit determining whether the peak amplitude of the current pulse is greater than a predetermined magnitude, and at least one routine employing the peak amplitude responsive to the determining of the second circuit to determine whether an arc fault condition exists in the power circuit.

The first circuit may include a peak detector storing the peak amplitude; the second circuit may determine a negative zero crossing of the current pulse, and responsive to the negative zero crossing, convert the peak amplitude to a corresponding digital value.

A plurality of half-cycles of the current may flow in the power circuit including a present half-cycle and a number of previous half-cycles, the half-cycles of current being defined by a current pulse having a peak amplitude of greater than the predetermined magnitude. The second circuit may include a first timer to determine a time to the present half-cycle from the previous half-cycle immediately prior to the present half-cycle.

The time may be a first time and the second circuit may further include a second timer to determine a second time from the current pulse having the peak amplitude of greater than the predetermined magnitude. The at least one routine may deactivate the at least one routine to the inactive state when the second time is a predetermined value.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with an aircraft arc fault circuit breaker, although the invention is applicable to a wide range of circuit interrupters adapted to detect arc faults in power circuits.

Figure 1:
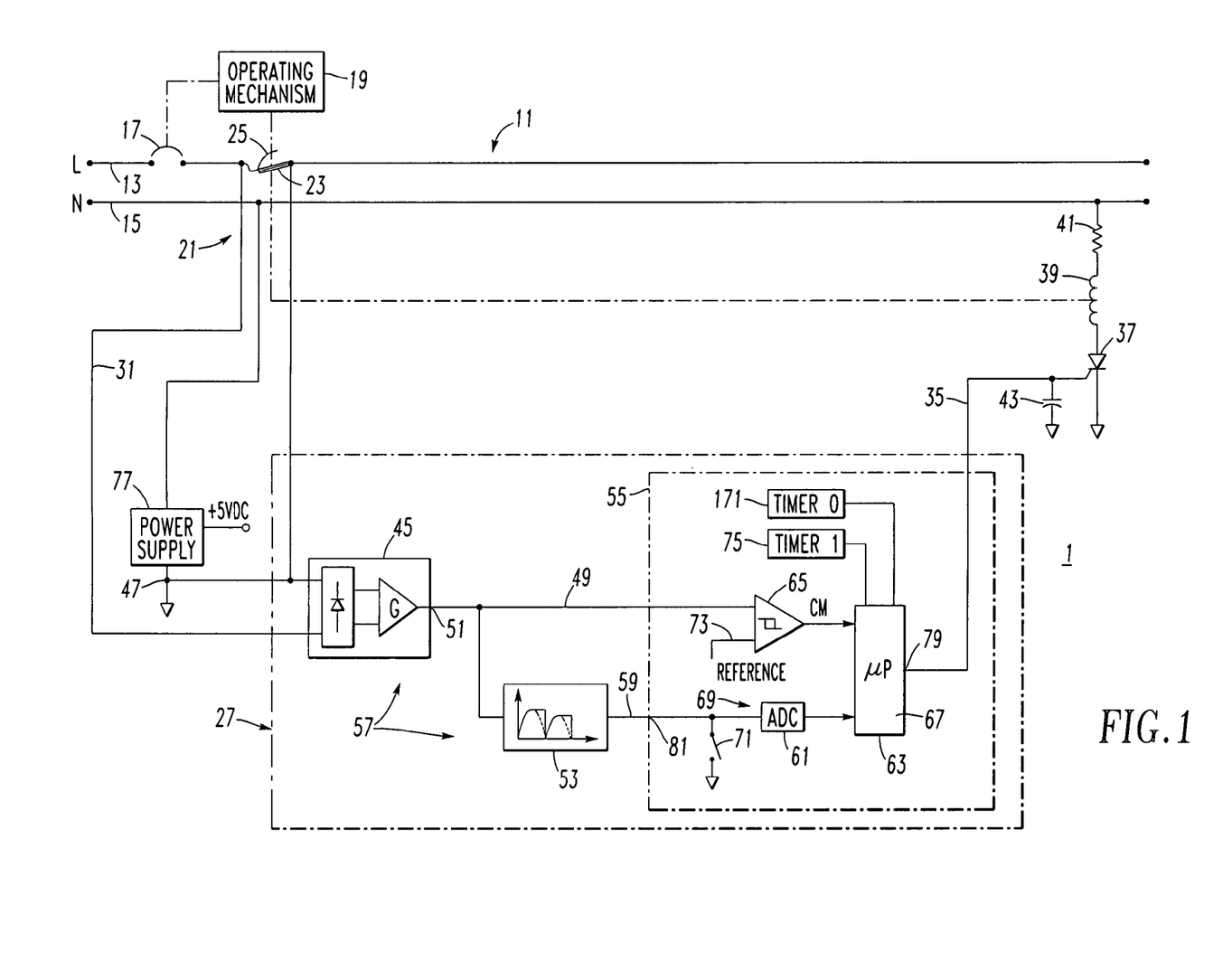
FIG. 1 is a block diagram of a circuit breaker in accordance with the present invention.

Referring to FIG. 1, an arc fault circuit breaker 1 is connected in an electric power system 11 which has a line conductor (L) 13 and a neutral conductor (N) 15. The circuit breaker 1 includes separable contacts 17 which are electrically connected in the line conductor 13. The separable contacts 17 are opened and closed by an operating mechanism 19. In addition to being operated manually by a handle (not shown), the operating mechanism 19 can also be actuated to open the separable contacts 17 by a trip assembly 21. This trip assembly 21 includes the conventional bimetal 23 which is heated by persistent overcurrents and bends to actuate the operating mechanism 19 to open the separable contacts 17. An armature 25 in the trip assembly 21 is attracted by the large magnetic force generated by very high overcurrents to also actuate the operating mechanism 19 and provide an instantaneous trip function.

The circuit breaker 1 is also provided with an arc fault detector (AFD) 27. The AFD 27 senses the current in the electrical system 11 by monitoring the voltage across the bimetal 23 through the lead 31 with respect to local ground reference 47. If the AFD 27 detects an arcing fault in the electric power system 11, then a trip signal 35 is generated which turns on a switch such as the silicon controlled rectifier (SCR) 37 to energize a trip solenoid 39. The trip solenoid 39 when energized actuates the operating mechanism 19 to open the separable contacts 17. A resistor 41 in series with the coil of the solenoid 39 limits the coil current and a capacitor 43 protects the gate of the SCR 37 from voltage spikes and false tripping due to noise. Alternatively, the resistor 41 need not be employed.

The AFD 27 cooperates with the operating mechanism 19 to trip open the separable contacts 17 in response to an arc fault condition. The AFD 27 includes an active rectifier and gain stage 45, which rectifies and suitably amplifies the voltage across the bimetal 23 through the lead 31 and the local ground reference 47. The active rectifier and gain stage 45 outputs a rectified signal 49 on output 51 representative of the current in the bimetal 23. The rectified signal 49 is input by a peak detector circuit 53 and a microcontroller (μC) 55.

The active rectifier and gain stage 45 and the peak detector circuit 53 form a first circuit 57 adapted to determine a peak amplitude 59 of a rectified alternating current pulse based upon the current flowing in the electric power system 11. The peak amplitude 59 is stored by the peak detector circuit 53.

The μ5 includes an analog-to-digital converter (ADC) 61, a microprocessor (μP) 63 and a comparator 65. The μP 63 includes one or more arc fault algorithms 67. The ADC 61 converts the analog peak amplitude 59 of the rectified alternating current pulse to a corresponding digital value for input by the μP 63. The μP 63, arc fault algorithm(s) 67 and ADC 61 form a second circuit 69 adapted to determine whether the peak amplitude of the current pulse is greater than a predetermined magnitude. In turn, the algorithm(s) 67 responsively employ the peak amplitude to determine whether an arc fault condition exists in the electric power system 11.

The μP 63 includes an output 71 adapted to reset the peak detector circuit 59. The second circuit 69 also includes the comparator 65 to determine a change of state (or a negative (i.e., negative-going) zero crossing) of the alternating current pulse of the current flowing in the electric power system 11 based upon the rectified signal 49 transitioning from above or below (or from above to below) a suitable reference 73 (e.g., a suitable positive value of slightly greater than zero). Responsive to this negative zero crossing, as determined by the comparator 65, the UP 63 causes the ADC 61 to convert the peak amplitude 59 to a corresponding digital value.

Unlike previous implementations, the arc fault detection method employed by the AFD 27 is "event-driven" in that it is inactive (e.g., dormant) until a current pulse occurs as detected by the comparator 65. When such a current pulse occurs, the algorithm(s) 67 record the peak amplitude 59 of the current pulse as determined by the peak detector circuit 53 and the ADC 61, along with the time since the last current pulse occurred as measured by a timer 75 (timer 1) associated with the μP 63. The arc fault detection method then uses the algorithm(s) 67 (which are described below in connection with FIGS. 4A-4D) to process the current amplitude and time information to determine whether a hazardous arc fault condition exists. The AFD 27 and the arc fault detection method thereof reduce the count of electronic components required to implement arc fault detection. In particular, this digital arc fault detection method does not require a line voltage zero-crossing detection signal (or the associated hardware).

Figure 2:
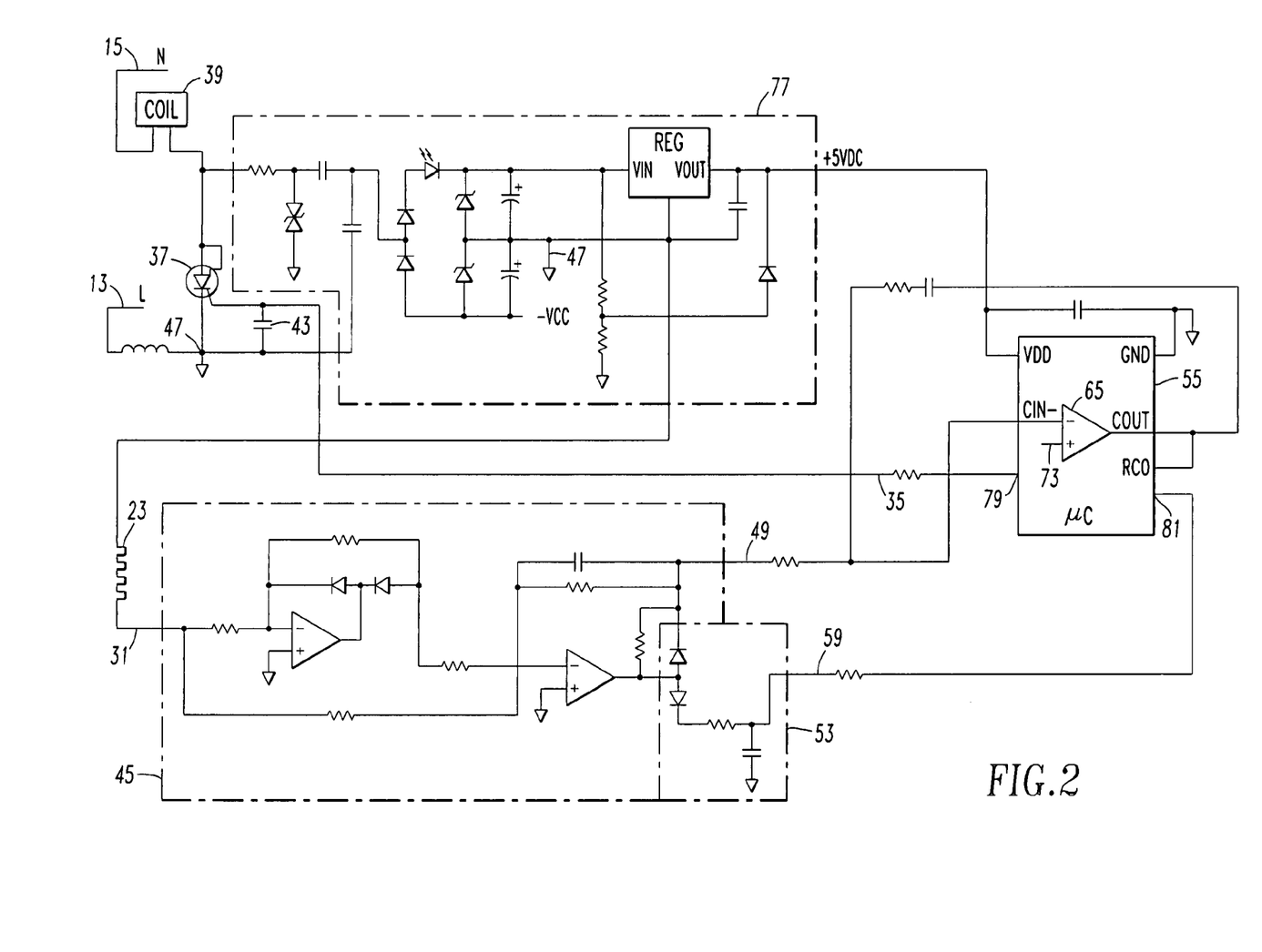
FIG. 2 is a block diagram in schematic form of the processor, power supply, active rectifier and gain stage, and peak detector of FIG. 1.

FIG. 2 is a block diagram in schematic form of the μC 55, power supply 77, active rectifier and gain stage 45, and peak detector 53 of FIG. 1. The μC 55 may be, for example, a suitable processor, such as model PIC16F676 marketed by Microchip Technology Inc. of Chandler, Ariz. A digital output 79 includes the trip signal 35. An analog input 81 receives the peak amplitude 59 for the ADC 61 (FIG. 1). Digital input RC0 of μC 55 is employed to read the output (COUT) of the comparator 65.

Figure 3A:
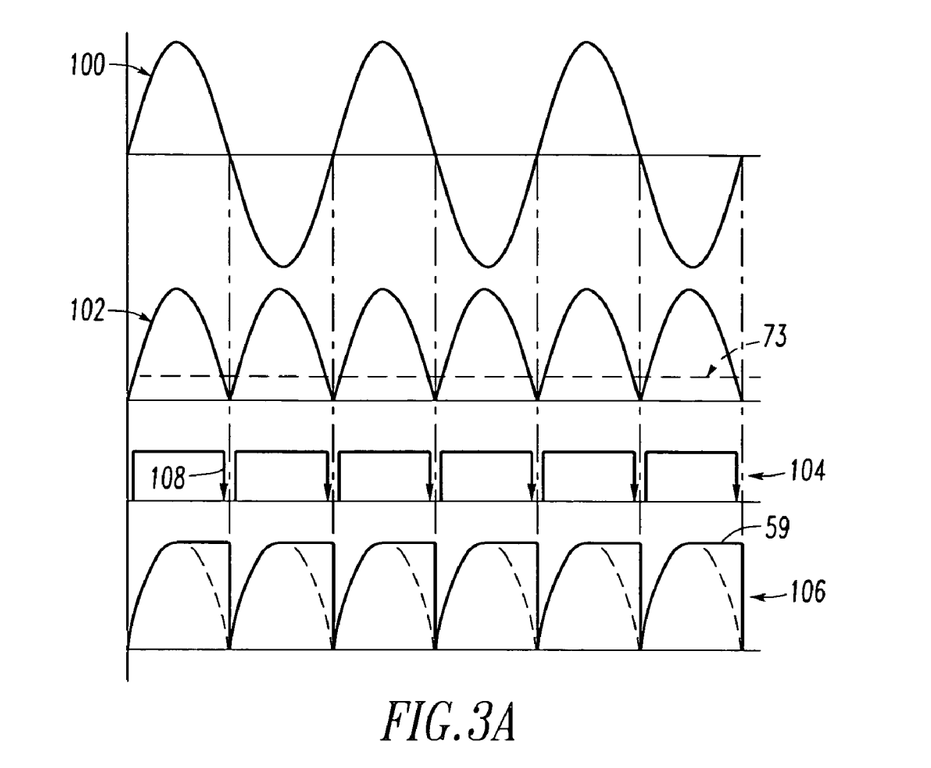
FIGS. 3A-3D are timing diagrams associated with the circuit breaker of FIG. 1.

FIGS. 3A-3D are timing diagrams associated with the circuit breaker 1 of FIG. 1. FIG. 3A shows example waveforms 100, 102, 104, 106 corresponding to the AC line current in the bimetal 23 of FIG. 1, the rectified signal 49 on output 51 of the active rectifier and gain stage 45, the output of the comparator 65, and the peak amplitude 59 of the peak detector circuit 53, respectively. In response to the falling edge 108 of the output of the comparator 65, the μP 63 is interrupted after which it: (1) samples the peak amplitude 59 by initiating an analog-to-digital conversation and then reading the output of the ADC 61; (2) resets the peak detector circuit 53 through the output 71; (3) records the time since the last such interrupt through the first (timer 1) timer 75; and (4) performs the one or more arc fault algorithms 67. Those algorithms 67 include a "time discounted accumulation" (or TDA) algorithm 110, a "short delay" algorithm 112, and a "series time discounted accumulation" (or series TDA) algorithm 114 as are discussed below in connection with FIGS. 4C and 4D.

Figure 3B:
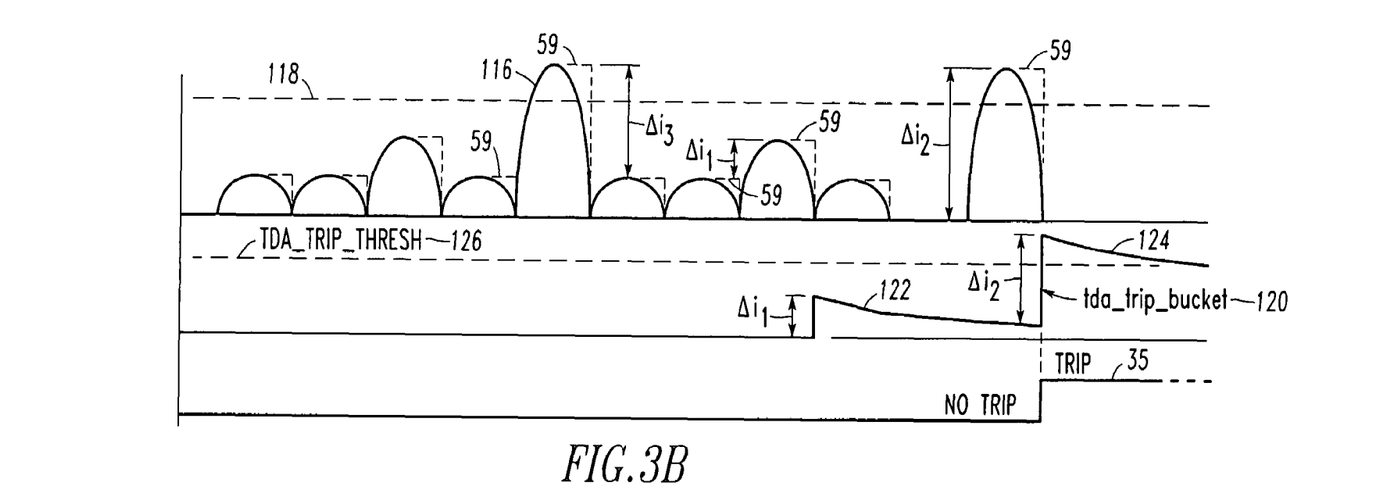

The TDA algorithm 110 is used for detecting arc faults which are characterized by intermittent current pulses of relatively high amplitude. A timing diagram illustrating operation of the TDA algorithm 110 is shown in FIG. 3B. First, an arming current pulse 116 whose peak is greater than a TDA arming threshold 118 (e.g., without limitation, about four times breaker handle rating) activates the TDA algorithm 110. This algorithm 110 deactivates some fixed time (e.g., equivalent to relatively many cycles) after the most recent arming pulse. While activated, the algorithm 110 accumulates increases (e.g., $\Delta i_1$; $\Delta i_2$) in the peak (current) amplitude 59 from half-cycle to half-cycle by adding an amount equivalent to each increase to an accumulator (tda_trip_bucket) 120. If the peak amplitude of the previous half-cycle of current is greater than about zero, then the algorithm 110 adds an amount equivalent to the increase (e.g., $\Delta i_1$) in the peak amplitude 59 from the previous half-cycle of current to the present half-cycle of current to the accumulator 120. However, decreases in the peak amplitude 59 (e.g., $\Delta i_3$) from half-cycle to half-cycle have no effect on the contents of the accumulator 120. On the other hand, if the previous half-cycle of current is about zero, then the algorithm 110 adds an amount (e.g., $\Delta i_2$) equivalent to the peak amplitude 59 of the present half-cycle (less zero) to the accumulator 120. The amount stored in the accumulator 120 slowly decays (e.g., in a linear or exponential fashion), as shown at 122 or 124, over time. If the amount stored in the accumulator 120 exceeds some preset trip value (TDA_TRIP_THRESH) 126, then the algorithm 110 declares that an arcing fault is present by setting the trip signal 35 true, in order to open the separable contacts 17 and interrupt the current in the electric power system 11.

Figure 3C:
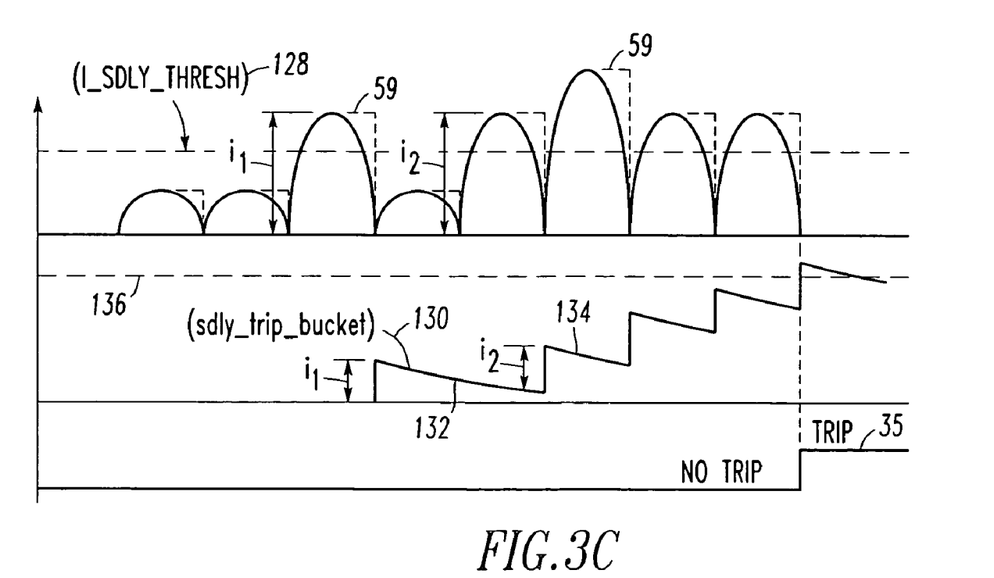

The short delay algorithm 112 is intended to quickly interrupt current in the electric power system 11 in the event of a relatively high-amplitude continuous fault. A timing diagram illustrating operation of the short delay algorithm 112 is shown in FIG. 3C. First, if the peak (current) amplitude 59 exceeds a predetermined short delay accumulation threshold (I_SDLY_THRESH) 128 (e.g., without limitation, about four times breaker handle rating), then an amount (e.g., $i_1$; $i_2$) equivalent to that peak amplitude is added to an accumulator (sdly_trip_bucket) 130. The amount stored in the accumulator 130 slowly decays (e.g., in a linear or exponential fashion), as shown at 132 or 134, over time. If the amount stored in the accumulator 130 exceeds a predetermined short delay trip threshold value 136, then the algorithm 112 declares that an arcing fault is present by setting the trip signal 35 true, in order to open the separable contacts 17 and interrupt the current in the electric power system 11.

Figure 3D:
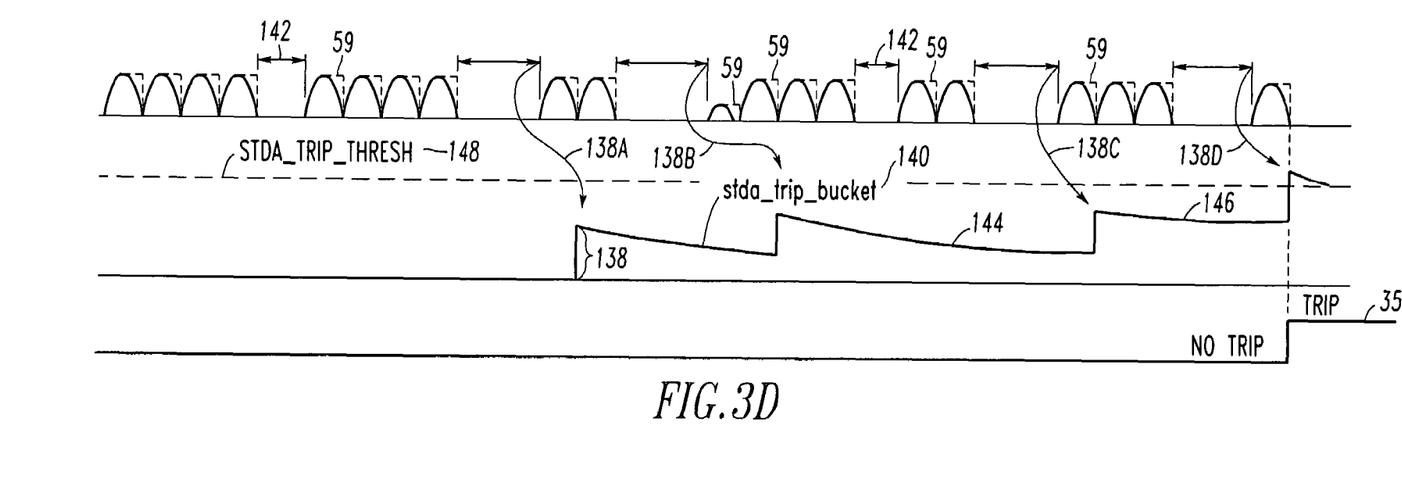

The series TDA algorithm 114 is intended to detect intermittent circuit connections caused by vibration. A timing diagram illustrating operation of the series TDA algorithm 114 is shown in FIG. 3D. This algorithm 114 counts "missing" (or about zero amplitude) half-cycles in otherwise continuous current. If a sufficient number of missing half-cycles occur within a relatively short enough period of time, then the electric power system 11 is interrupted. First, if the peak amplitude 59 of a half-cycle of current is greater than about zero (and presumably is less than the handle rating of the circuit breaker 1) and if the peak amplitude of the previous, for example, two half-cycles of current is about zero, then a predetermined fixed amount 138 is added to an accumulator (stda_trip_bucket) 140, for example, as shown at 138A,138B, 138C,138D. Otherwise, even if the peak amplitude 59 of a half-cycle of current is greater than about zero, but the peak amplitude of the previous half-cycle(s) was zero for less than, for example, two half-cycles of current, as shown at 142, then nothing is added to an accumulator. The amount stored in the accumulator 140 slowly decays (e.g., in a linear or exponential fashion) over time, as shown at 144 or 146. If the amount stored in the accumulator 140 exceeds a predetermined trip value (STDA_TRIP_THRESH) 148, then the algorithm 114 declares that an arcing fault is present by setting the trip signal 35 true, in order to open the separable contacts 17 and interrupt the current in the electric power system 11.

Figure 4A:
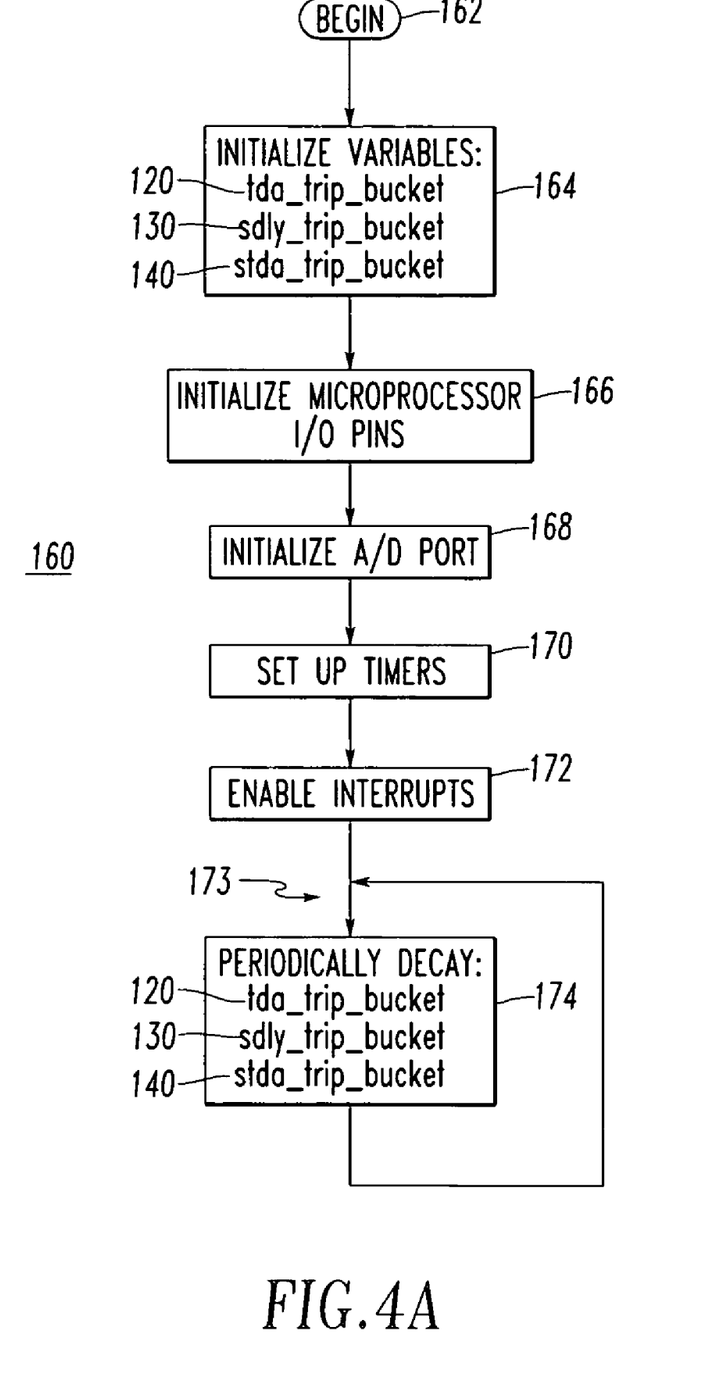
FIGS. 4A-4D are flow charts of software executed by the processor of FIG. 2.

FIGS. 4A-4D are flow charts of software executed by the μC 55 of FIGS. 1 and 2. FIG. 4A shows a startup and main loop routine 160, which begins at 162. Next, at 164, the accumulator variables tda_trip_bucket 120, sdly_rip_bucket 130 and stda_trip_bucket 140 are initialized. Then, at 166, the inputs/outputs of the μP 63 (FIG. 1) are initialized, after which the ADC 61 (FIG. 1) is initialized at 168. Next, at 170, the two timers 75, 171 (FIG. 1) are initialized after which, at 172, interrupts to the μP 63 are enabled. Finally, a main loop 173 is repeated at 174. This functions to periodically decay the accumulator variables tda_trip_bucket 120, sdly_trip_bucket 130 and stda_trip_bucket 140. If any of the values of those accumulators 120, 130, 140 exceeds the corresponding trip threshold value, as is discussed below in connection with FIGS. 4C and 4D, then the circuit breaker 1 is tripped.

Figure 4B:
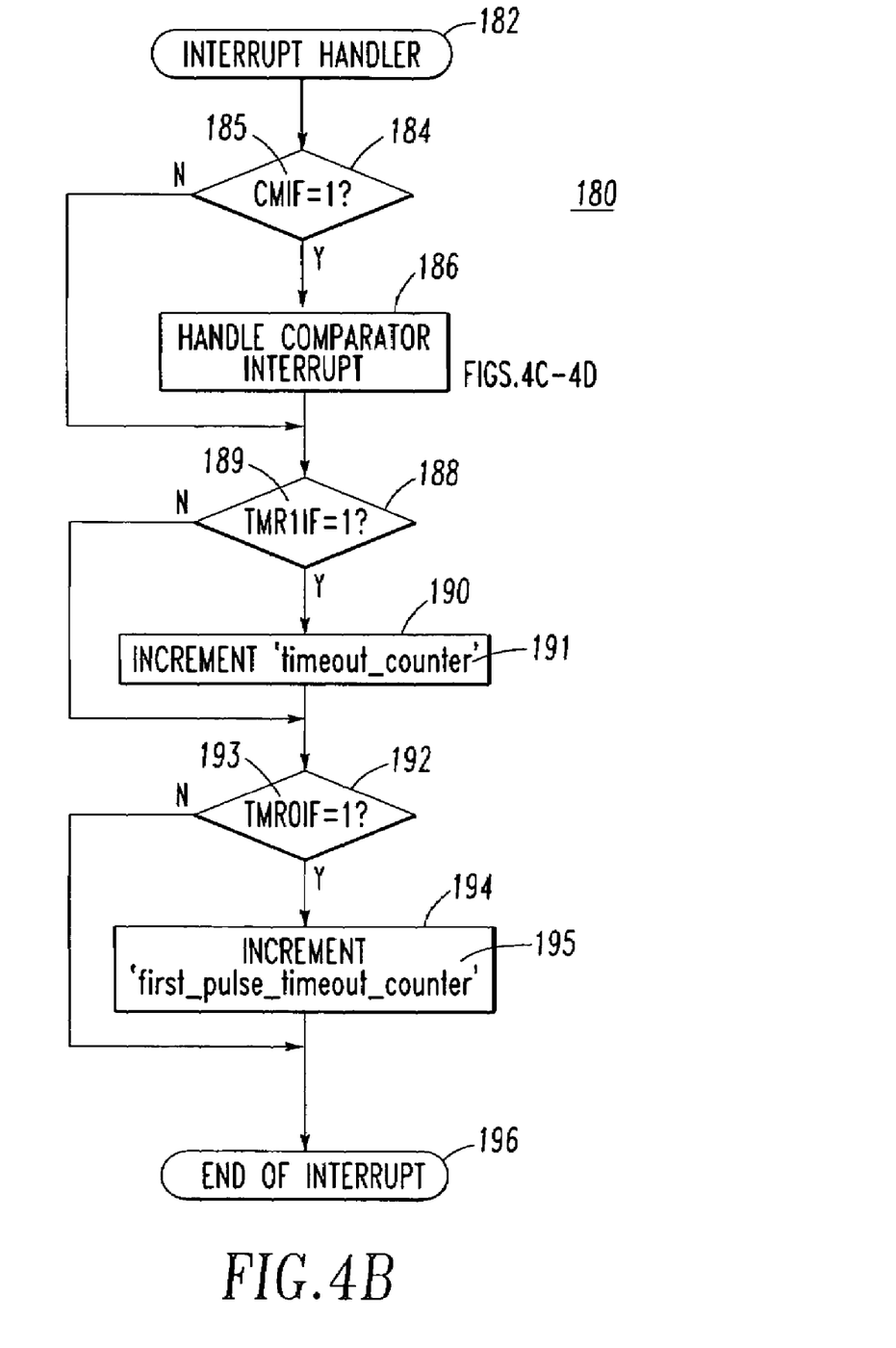
Figure 4C:
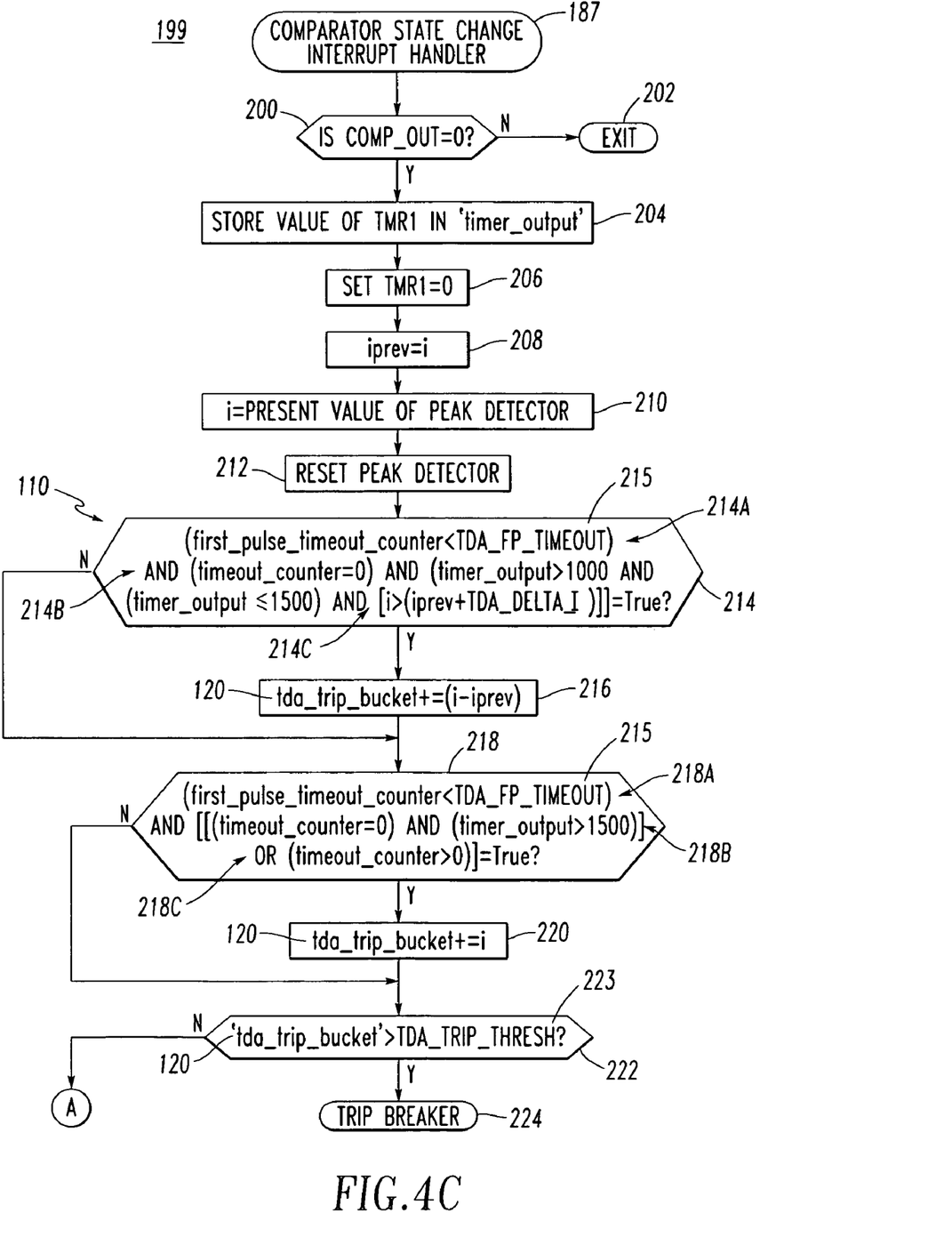
Figure 4D:
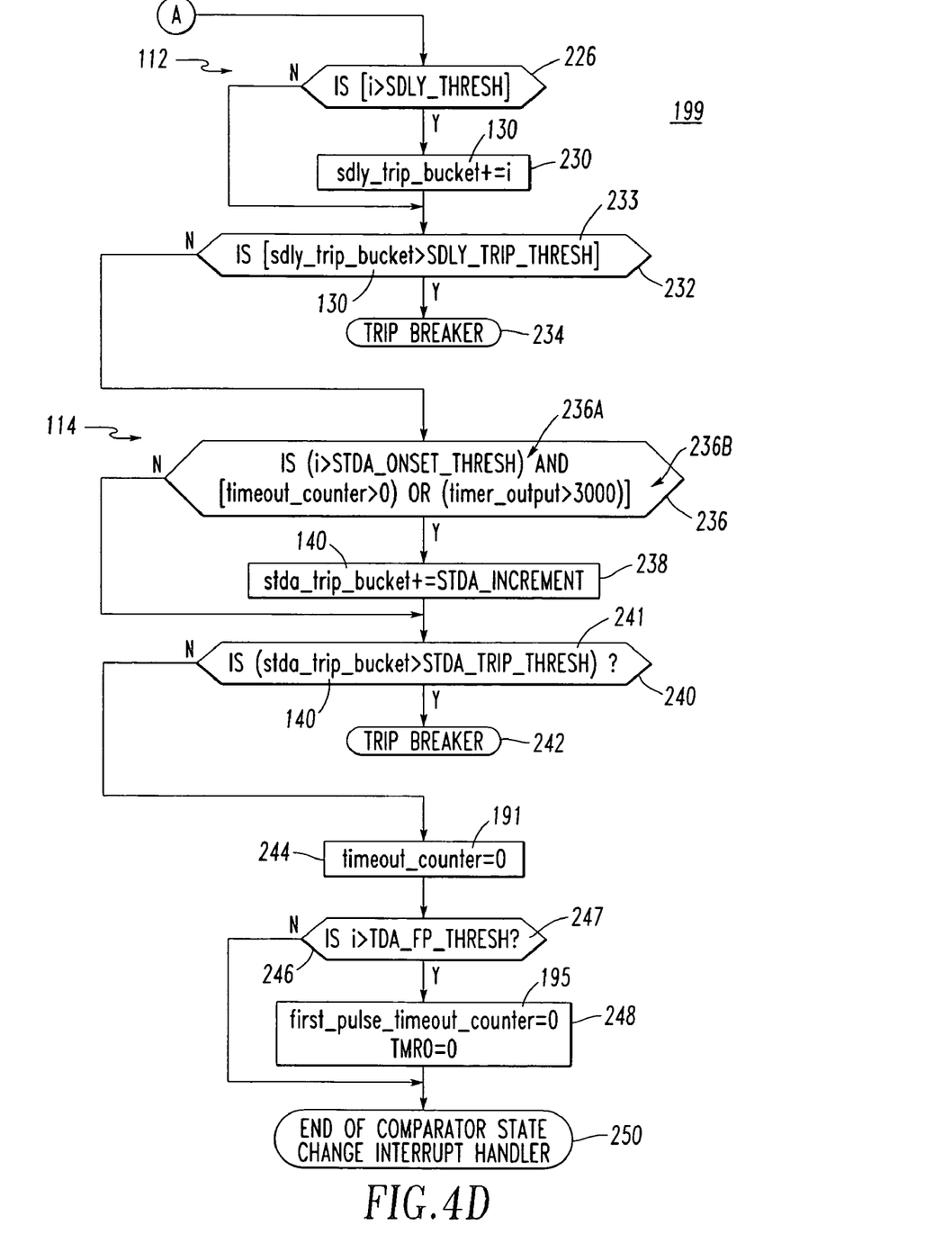

FIG. 4B shows the interrupt handler routine 180, which responds to one or more of three interrupts generated by the comparator 65 and the two timers 75, 171 of FIG. 1. The routine 180 begins at 182 responsive to one of the three interrupts. Next, at 184, it is determined if the comparator interrupt flag CMIF 185 is true. This determines whether the interrupt was generated by the change of state of the comparator 65. If so, then the comparator interrupt routine 186 of FIGS. 4C-4D is executed starting at 187 of FIG. 4C. If not, or after 186, at 188, it is determined if the first timer interrupt flag TMR1IF 189 is true. This determines whether the interrupt was generated by the overflow of the counter of the timer 75, which tracks the elapsed time (to the present current pulse) since the last current pulse. If so, then the counter timeout_counter 191 is incremented at 190. If not, or after 190, at 192, it is determined if the second timer interrupt flag TMR0IF 193 is true. This determines whether the interrupt was generated by the overflow of the counter of the timer 171, which tracks the elapsed time (to the present current pulse of sufficient amplitude) since the last current pulse of sufficient amplitude to arm the TDA algorithm 110 as determined at 246 of FIG. 4D. If so, then the counter first_pulse_timeout_counter 195 is incremented at 194. If not, or after 194, at 196, the routine 180 returns.

FIGS. 4C-4D show the comparator state change interrupt handler 199, which begins at 187. First, at 200, it is determined if the output (COMP_OUT) of the comparator 65 of FIG. 1 is zero. If not, then a rising edge of the rectified signal 49 was detected and the interrupt handler 199 exits and returns at 202. On the other hand, if the output of the comparator 65 is zero, then a falling edge of the rectified signal 49 was detected and execution resumes at 204. Even steps 204-212 gather information for use by the three algorithms 110, 112,114 of FIGS. 4C and 4D. At 204, the value (TMR1) of the first timer 75 is stored in the value timer_output, which stores the time elapsed since the time of the previous current pulse. Next, at 206, the value TMR1 is cleared in the first timer 75, which begins to track the time until the next current pulse occurs. Then, at 208, the previously sampled current, i, is stored in the variable, $i_{prev}$. Next, at 210, the present value, peak amplitude 59, of the peak detector 53 is read and is stored in the variable, i. Then, at 212, the output 71 (FIG. 1) is momentarily set to zero, in order to reset the peak detector 53.

Even steps 214-224 define the TDA algorithm 110. First at 214, it is determined if three conditions 214A,214B,214C are all true. The first condition (first_pulse_timeout_counter 195<TDA_FP_TIMEOUT 215) 214A is true if the TDA algorithm 110 has been armed (at step 248 of FIG. 4D) by a recent suitably high current pulse. Otherwise, the TDA algorithm 110 is deactivated to an inactive state after a suitable time (e.g., without limitation, about two cycles of the counter 195 or about 131.072 ms). The second condition (timeout_counter=0 AND timer_output>1000 AND timer_output≦1500) (e.g., without limitation, for a 400 Hz system in which half cycles occur at 800 Hz or every 1.25 ms) 214B is true if the previous current pulse occurred between 1.0 ms and 1.5 ms ago, such that the amplitude of the most recent half-cycle of current is non-zero. The third condition (i>($i_{prev}$+TDA_DELTA_I) 214C is true if the increase in the peak current with respect to the current of the previous half-cycle exceeds a minimum predetermined value. If all three conditions, 214A,214B,214C, at 214, are true, then, at 216, the accumulator tda_trip_bucket 120 is incremented by the difference between the magnitudes of the most recent and the previous current pulses (ie., i-$i_{prev}$).

The first timer (timer 1) 75, which tracks the time since the last current pulse, is, for example, a 16-bit timer that increments one count every 1 μs. This timer 75 rolls over and increments timeout_counter 191 at 190 of FIG. 4B about once every 65.536 ms, which is about 26 cycles at 400 Hz. The counter timeout_counter 191 is reset at 244 of FIG. 4D. Although a 400 Hz power system is disclosed, the present invention is applicable to a wide range of alternating current systems (e.g., without limitation, 50 Hz; 60 Hz).

The second timer (timer 0) 171, which tracks the time since the last current pulse which exceeds the TDA arming threshold, is, for example, an 8-bit timer with 256 prescale that increments one count every 256 μs. This timer 171 rolls over and increments first_pulse_timeout_counter 195 at 194 of FIG. 4B about once every 65.536 ms. The counter first_pulse_timeout_counter 195 is reset at 248 of FIG. 4D.

On the other hand, if the condition at 214 is false, or after 216, then, at 218, it is determined if a first condition 218A and one of two other conditions 218B,218C are true. The first condition (first_pulse_timeout_counter<TDA_FP_TIMEOUT) 218A is true if the TDA algorithm 120 has been armed by a recent suitably high current pulse. The second condition (timeout_counter=0 AND timer_output>1500) 218B or the third condition (timer_counter>0) 218C is true if the previous half-cycle of current was about zero. If the test at 218 is true, then at 220, the accumulator tda_trip_bucket 120 is incremented by the magnitude of the most recent current pulse (i.e., i).

On the other hand, if the condition at 218 is false, or after 220, then, at 222, it is determined if the accumulator tda_trip_bucket 120 is greater than the TDA trip threshold 223, TDA_TRIP_THRESH. If so, the signal 35 (FIG. 1) is set to trip the circuit breaker 1 at 224. Otherwise, execution resumes at 226 of FIG. 4D with the short delay algorithm 112.

First, at 226, it is determined if the amplitude i of the present current pulse is greater than the short delay threshold, SDLY_THRESH. If so, then the accumulator sdly_rip_bucket 130 is incremented by the amplitude i at 230. Otherwise, or after 230, at 232, it is determined if accumulator sdly_trip_bucket 130 is greater than the short delay trip threshold 233, SDLY_TRIP_THRESH. If so, the signal 35 is set to trip the circuit breaker 1 at 234. Otherwise, execution resumes at 236 of FIG. 4D with the series TDA algorithm 114.

First, at 236, it is determined if two conditions 236A, 236B are true. The first condition 236A is true if the amplitude i of the present current pulse is greater than the series TDA onset threshold, STDA_ONSET_THRESH. This ensures that the present current pulse is non-zero. The second condition (timeout_counter>0 OR timer_output>3000) 236B is true if there has been at least two previous half-cycles of about zero current. If so, then the accumulator stda_trip_bucket 140 is incremented by a predetermined constant, STDA_INCREMENT, at 238. Otherwise, or after 238, at 240, it is determined if accumulator stda_trip_bucket 140 is greater than the series TDA trip threshold 241, STDA_TRIP_THRESH. If so, the signal 35 is set to trip the circuit breaker 1 at 242.

Otherwise, execution resumes at 244, which resets the counter timeout_counter 191 to be zero since a current pulse has just occurred. Next, at 246, it is determined if a current pulse of sufficient amplitude to arm the TDA algorithm 110 has just occurred by checking if the amplitude i of the present current pulse is greater than a predetermined threshold 247, TDA_FP_THRESH. If so, then at 248, the counter first_pulse_timeout_counter 195 is set to zero and the value TMR0 is cleared. This deactivates the tests of step 214, 218 of the TDA algorithm 110 of FIG. 4C. Otherwise, or after 248, at 250, the interrupt handler 199 exits and returns.

Although the AFD 27 implements the algorithms 67 in, for example, firmware of the µC 55, it will be appreciated that a combination of one or more of analog, digital and/or processor-based circuits may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of detecting an arc fault in a power circuit, said method comprising:
   determining a peak amplitude of a current pulse of a current flowing in said power circuit;
   determining whether the peak amplitude of said current pulse is greater than a predetermined magnitude;
   responsively employing at least one algorithm and said peak amplitude to determine whether an arc fault condition exists in said power circuit;
   determining that said current pulse has said peak amplitude of greater than said predetermined magnitude and responsively activating said at least one algorithm from said inactive state;
   employing a plurality of half-cycles of said current flowing in said power circuit including a present half-cycle and a previous half-cycle; and employing as one of said at least one algorithms:
      determining the peak amplitude of said current pulse for the present half-cycle and the previous half-cycle,
      determining that the peak amplitude of said current pulse for the previous half-cycle is greater than about zero and responsively adding an amount equivalent to an increase in said peak amplitude from the previous half cycle to the present half-cycle to an accumulator, and otherwise, adding an amount equivalent to said peak amplitude of said present half-cycle to said accumulator,
      decaying the amount stored in said accumulator over time, and
      determining an arc fault condition in said power circuit if the amount stored in said accumulator exceeds a predetermined value.

2. The method of claim 1 further comprising
   maintaining said at least one algorithm in an inactive state until after determining that said current pulse has said peak amplitude of greater than said predetermined magnitude.

3. The method of claim 2 further comprising
   employing a voltage in said power circuit; and
   activating said at least one algorithm from said inactive state without sensing the voltage of said power circuit.

4. The method of claim 2 further comprising
   employing a voltage having a zero-crossing in said power circuit; and
   activating said at least one algorithm from said inactive state without detecting the zero-crossing of the voltage of said power circuit.

5. The method of claim 1 further comprising
   deactivating said at least one algorithm to said inactive state a predetermined time after said responsively activating.

6. The method of claim 1 further comprising
   employing as said predetermined magnitude about four times a rated value of said current flowing in said power circuit; and
   activating said at least one algorithm from said inactive state when said current pulse exceeds said predetermined magnitude.

7. A method of detecting an arc fault in a power circuit, said method comprising;
   determining a peak amplitude of a current pulse of a current flowing in said power circuit;
   determining whether the peak amplitude of said current pulse is greater than a predetermined magnitude;
   responsively employing at least one algorithm and said peak amplitude to determine whether an arc fault condition exists in said power circuit;
   determining that said current pulse has said peak amplitude of greater than said predetermined magnitude and responsively activating said at least one algorithm from said inactive state;
   employing a plurality of half cycles of said current flowing in said power circuit including a present half-cycle and a number of previous half-cycles, said half cycles of current being defined by a current pulse having a peak amplitude of greater than said predetermined magnitude;
   determining a time to the present half-cycle from the previous half-cycle which is immediately prior to said present half-cycle;
   employing as one of said at least one algorithms:
      determining that said time to the present half-cycle from the previous half-cycle which is immediately prior to said present half-cycle is greater than a predetermined time and responsively adding a predetermined amount to an accumulator,
      decaying the amount stored in said accumulator over time, and
      determining an arc fault in said power circuit if the amount stored in said accumulator exceeds a predetermined value.

8. The method of claim 7 further comprising
   employing as said predetermined time a time equal to about a duration of two of said half-cycles.

9. An arc fault circuit interrupter comprising:
   separable contacts;
   an operating mechanism adapted to open and close said separable contacts; and
   a trip mechanism cooperating with said operating mechanism to trip open said separable contacts, said trip mechanism conspiring:
      a first circuit determining a peak amplitude of a current pulse of said current flowing in said power circuit,
      a second circuit determine whether the peak amplitude of said current pulse is greater than a predetermined magnitude, and
      at least one routine employing said peak amplitude responsive to said determining of said second circuit to determine whether an arc fault condition exists in said power circuit;

wherein said first circuit comprises a peak detector storing said peak amplitude; and wherein said second circuit determines a negative zero crossing of said current pulse, and responsive to said negative zero crossing, converts said peak amplitude to a corresponding digital value.

10. An arc fault circuit interrupter comprising:
separable contacts;
an operating mechanism adapted to open and close said separable contacts; and
a trip mechanism cooperating with said operating mechanism to trip open said separable contacts, said trip mechanism comprising:
  a first circuit determining a peak amplitude of a current pulse of said current flowing in said power circuit,
  a second circuit determining whether the peak
  amplitude of said current pulse is greater than a predetermined magnitude, and
  at least one routine employing said peak amplitude responsive to said determining of said second circuit to determine whether an arc fault condition exists in said power circuit;
  wherein a plurality of half-cycles of said current flow in said power circuit including a present half-cycle and a number of previous half-cycles, said half cycles of current being defined by a current pulse having a peak amplitude of greater than said predetermined magnitude; and wherein said second circuit comprises a first timer to determine a time to the present half-cycle from the previous half cycle immediately prior to said present half-cycle.

11. The arc fault circuit interrupter of claim 10 wherein said time is a first time; wherein said second circuit further comprises a second timer to determine a second time from said current pulse having said peak amplitude of greater than said predetermined magnitude; and wherein said at least one routine deactivates said at least one routine to said inactive state when said second time is a predetermined value.

12. An arc fault circuit interrupter comprising;
separable contacts;
  an operating mechanism adapted to open and close said separable contacts; and
  a trip mechanism cooperating with said operating mechanism to trip open said separable contacts, said trip mechanism comprising;
  a first circuit determining a peak amplitude of a current pulse of said current flowing in said power circuit,
  a second circuit determining whether the peak
  amplitude of said current pulse is greater than a predetermined magnitude, and
  at least one routine employing said peak amplitude responsive to said determining of said second circuit to determine whether an arc fault condition exists in said power circuit;
  wherein said current pulse has said peak amplitude of greater than said predetermined magnitude and said at least one routine is activated from said inactive state;
  wherein a plurality of half-cycles of said current flow in said power circuit including a present half-cycle and a previous half-cycle; and wherein one of said at least one routine is adapted to determine the peak amplitude of said current pulse for the present half-cycle and the previous half-cycle, determine that the peak amplitude of said current pulse for the previous half-cycle is greater than about zero and responsively add an amount equivalent to an increase in said peak amplitude from the previous half-cycle to the present half-cycle to an accumulator, and otherwise, add an amount equivalent to said peak amplitude of said present half cycle to said accumulator, decay the amount stored in said accumulator over time, and determine an arc fault condition in said power circuit if the amount stored in said accumulator exceeds a predetermined value.

13. An arc fault circuit interrupter comprising:
separable contacts;
an operating mechanism adapted to open and close said separable contacts; and
a trip mechanism cooperating with said operating mechanism to trip open said separable contacts, said trip mechanism comprising;
  a first circuit determining a peak amplitude of a current pulse of said current flowing in said power circuit,
  a second circuit determining whether the peak
  amplitude of said current pulse is greater than a predetermined magnitude, and
  at least one routine employing said peak amplitude responsive to said determining of said second circuit to determine whether an arc fault condition exists in said power circuit;
wherein said current pulse has said peak amplitude of greater than said predetermined magnitude and said at least one routine is activated from said inactive state; wherein a plurality of half cycles of said current flow in said power circuit including a present half-cycle and a number of previous half-cycles, said half-cycles of current being defined by a current pulse having a peak amplitude of greater than said predetermined magnitude; wherein said at least one routine is adapted to determine a time to the present half-cycle from the previous half-cycle which is immediately prior to said present half-cycle; and wherein one of said at least one routines is adapted to determine that said time to the present half-cycle from the previous half-cycle which is immediately prior to said present half-cycle is greater than a predetermined time and responsively add a predetermined amount to an accumulator, decay the amount stored in said accumulator over time, and determine an are fault in said power circuit if the amount stored in said accumulator exceeds a predetermined value.

* * * * *